(12) United States Patent
Yang et al.

(10) Patent No.: US 11,932,280 B2
(45) Date of Patent: Mar. 19, 2024

(54) SITUATION HANDLING AND LEARNING FOR AN AUTONOMOUS VEHICLE CONTROL SYSTEM

(71) Applicant: Ford Global Technologies, LLC, Dearborn, MI (US)

(72) Inventors: Hao Howard Yang, Ann Arbor, MI (US); Tavan Eftekhar, Farmington Hills, MI (US); Yiming Duan, Dearborn, MI (US); Roy Hwang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 17/099,055

(22) Filed: Nov. 16, 2020

(65) Prior Publication Data

US 2022/0153311 A1    May 19, 2022

(51) Int. Cl.
*B60W 60/00*       (2020.01)
*G01C 21/34*       (2006.01)
*G06F 16/23*       (2019.01)

(52) U.S. Cl.
CPC ... *B60W 60/00253* (2020.02); *G01C 21/3415* (2013.01); *G06F 16/2379* (2019.01); *B60W 2556/10* (2020.02); *B60W 2556/50* (2020.02)

(58) Field of Classification Search
CPC ........ B60W 60/00253; B60W 2556/50; G01C 21/3415; G01C 21/3453; G06F 16/2379; H04W 4/024
See application file for complete search history.

(56) References Cited

U.S. PATENT DOCUMENTS

| 10,921,811 | B2* | 2/2021 | Levinson | G05D 1/0297 |
| 2017/0132934 | A1 | 5/2017 | Kentley et al. | |
| 2017/0248963 | A1* | 8/2017 | Levinson | B60R 21/01 |
| 2018/0088571 | A1* | 3/2018 | Weinstein-Raun | G05D 1/0027 |
| 2018/0136656 | A1* | 5/2018 | Rasmusson, Jr. | |

(Continued)

OTHER PUBLICATIONS

Schroer, Alyssa, "Artificial Intelligence in Cars Powers an AI Revolution in the Auto Industry", 10 Examples of AI Automotive/Built in, Dec. 19, 2019, updated Jan. 13, 2020, 14 pages.

*Primary Examiner* — Amelia Vorce
(74) *Attorney, Agent, or Firm* — Brandon Hicks; Eversheds Sutherland (US) LLP (57) ABSTRACT

An autonomous vehicle (AV) system includes an AV control system that resolves unique situations encountered while operating as a ride hail provider. The AV control system includes an artificial intelligence (AI) agent programmed to receive a situation data set as an input from vehicle sensors or from another AI agent. The situation data set can include a generic representation of information describing and characterizing the circumstances and details of the current situation. The system may access a knowledge library having catalogued prior situation data sets describing situations encountered by the AV or other vehicles in a fleet. The AV control system may search the knowledge library for similar situations encountered by a fleet vehicle. Once a similar situation is identified, the AV control system may identify one or more remedies that were executed to handle the prior situation, and execute the remedy to address the current situation.

20 Claims, 7 Drawing Sheets

(56) References Cited

U.S. PATENT DOCUMENTS

| | | | |
|---|---|---|---|
| 2018/0164106 A1* | 6/2018 | Peterson | |
| 2018/0284770 A1* | 10/2018 | VandenBerg, III | G08G 1/20 |
| 2019/0197402 A1 | 6/2019 | Kovacs et al. | |
| 2019/0286143 A1* | 9/2019 | Ross | B60W 60/0059 |
| 2019/0310627 A1 | 10/2019 | Halder | |
| 2019/0361454 A1* | 11/2019 | Zeng | |
| 2020/0004245 A1 | 1/2020 | Rychtyckyj et al. | |
| 2020/0103239 A1* | 4/2020 | Schwie | G08G 1/0141 |
| 2020/0409386 A1* | 12/2020 | Thakur | |
| 2021/0223051 A1* | 7/2021 | Hochberg | |
| 2022/0003561 A1* | 1/2022 | Shoval | G01C 21/362 |

\* cited by examiner

Task name: (name of this task)
Task id: (unique id of this task)
Actor: (the actor which will take this task)
Action: (the action that embodies this task)
Goal: (the goal of this task)
Spec: (list of specs of the task, optional)
Condition: (list of conditions to be met before the execution of this task)
Context: (list of contexts in the form of attribute : value)
Subtasks: (list of subtasks to take to perform this task)
Effect: (a list of effects that will occur after performing this task)
Est. time: (estimated time to complete the task)
Actual time: (record of actual time that the task was competed)

SITUATION HANDLING AND LEARNING FOR AN AUTONOMOUS VEHICLE CONTROL SYSTEM

FIELD

The present disclosure relates to autonomous vehicles, and more particularly, to rider service handling systems for autonomous vehicle controllers.

BACKGROUND

An autonomous vehicle (AV) system is supposed to operate without constant supervision of human operators. In some instances, the AV vehicle encounters unexpected situations, which are sometimes referred to as "corner," or "edge" cases, where the vehicle may not have a point of reference or specific programming to independently manage the situation. The situations referred to here are for the edge cases of the AV serving human passengers.

Conventional approaches to programming an AV system to handle unexpected situations often requires intensive and continuous updates that can result in an increasingly larger and larger codebase for handling sparsely encountered situations. This approach can require intensive and continuous system software updates and an increasingly larger and larger codebase and control algorithms for handling these sparsely encountered situations. With conventional approaches, when a situation involves a new corner case that has not been previously encountered, human intervention may be required to resolve the situation.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured and/or programmed to control an autonomous vehicle (AV) deployed as a ridehail service vehicle. The AV may include an AV control system. In contrast with conventional approaches for control system updates described above, where the AV control system is conventionally pre-programmed to handle discrete situations that may arise in operation, the present system operates and self-updates using case-based reasoning to resolve previously unencountered situations.

The AV control system may structure a current situation, or use case, into a single representation that characterizes the situation into classes, to evaluate the situation, control the vehicle through previously un-encountered situations and environments, and catalogue details associated with the novel encounter. The generic structure is then mappable to other similar but novel situations that the AV has previously not encountered. Instead of utilizing domain knowledge distilled to custom programming that must be continuously incorporated into custom algorithms, the AV control system agent utilizes a dependent task structure having a generic format.

In an example embodiment, the AV control system may receive a situation data set as an input from vehicle sensors, or from another artificial intelligence agent, such as a dialogue agent. The situation data set can include a generic representation of information describing and characterizing the contexts and details of the current situation. The AV control system may then access a knowledge library having catalogued prior situation data sets that describe earlier situations managed by the AV or other similar vehicles in a vehicle fleet. The AV control system may search the knowledge library by comparing the current situation data set to prior situation data sets in the knowledge library, and determine whether a similar situation was encountered by a fleet vehicle. Once a similar situation is identified, the AV control system may identify one or more remedies that were executed to handle the prior situation.

Embodiments of the present disclosure may avoid inefficiencies associated with ad-hoc programming solutions being used to solve novel situations.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

When autonomous vehicles interact with ridehail passengers, current autonomous vehicle technology may not account for situational issues that may affect user experience. Conversely, a human vehicle operator may observe environmental factors that, with a small adjustment, could significantly improve the rider experience. For example, a human driver may observe a deep puddle at the requested drop-off point, and adjust the vehicle position such that the ridehail passengers do not have to exit the vehicle and step into a deep puddle.

In another example, a human driver may arrive at a scheduled pick-up point, where the ridehail passenger has not yet arrived. A conventional autonomous vehicle may include programming that causes the vehicle to wait at the pick-up point for a prescribed time, and register the rider as a no-show if they do not arrive at the pick-up point within the prescribed time. By comparison, a human driver may investigate the situation to appreciate factors that may have delayed the passenger's arrival at the pickup point, such as inclement weather, a traffic accident that has slowed foot traffic in the area, or a nearby event that has ended, which may cause a foot traffic delay. If the human driver knows of mitigating circumstances such as these few examples, the driver may be inclined to wait a bit longer before concluding that the ridehail passenger is a no-show. The ridehail passenger, when arriving late, may feel gratitude for thoughtful consideration by a driver as she or he waits the extra time for the user to arrive at the pick-up point. On the other hand, a conventional autonomous vehicle may not apply a change in protocol to account for the described situation, because the vehicle controller has not been programmed to identify and remedy the mitigating circumstances. It is advantageous, therefore, to provide an artificial intelligence control system agent configured and/or programmed to identify and/or receive indications of an unexpected situation, and generate a set of tasks that, when executed, may improve the user experience for a ridehail passenger.

According to an example embodiment, the AV control system may include an artificial intelligence (AI) agent enabled to evaluate a unique situation, such as one of the above described examples, to determine and execute an appropriate remedy for a unique problem or situation. The AI agent may cause the AV to accomplish tasks autonomously in unique and previously unencountered situations, without external logic or continuous programming updates that instruct the vehicle on handling such a situation. The AI agent may further include programming and processing configurations that can generate and plan tasks that, when executed, cause the AV to perform discrete steps that remedy and/or address the novel situation.

In another aspect, the AV control system may self-update with acquired knowledge using a case archiving and indexing function that can enrich the AI framework for future use when encountering unique but similar situations. The AV control system may further include a natural language interface, and a simulation module configured and/or programmed to self-validate various solutions prior to implementing trip tasks associated with remedies that were and were not effective in the prior similar situations.

Figure 1:
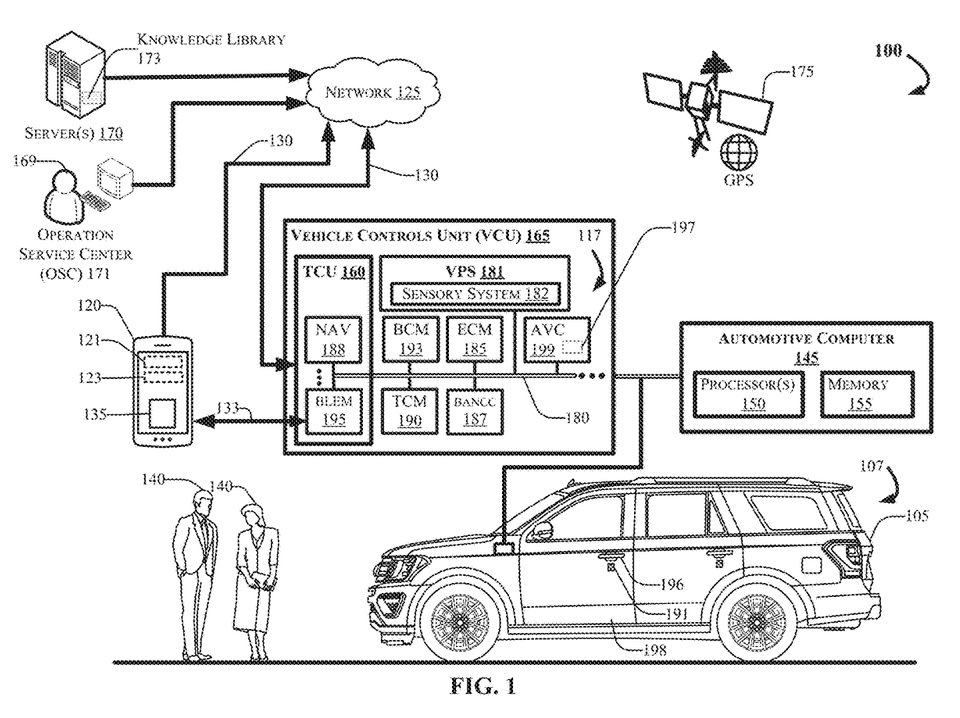
FIG. 1 depicts an example computing environment in which techniques and structures for providing the systems and methods disclosed herein may be implemented.

FIG. 1 depicts an example computing environment 100 that can include a vehicle 105. The vehicle 105 may include an automotive computer 145, and a Vehicle Controls Unit (VCU) 165 that typically includes a plurality of electronic control units (ECUs) 117 disposed in communication with the automotive computer 145. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), and other possible data connection and sharing techniques.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system is configured and/or programmed to operate in conjunction with an AV controller (AVC) 199 (described in greater detail with respect to FIG. 4). In other aspects, the GPS 175 may be a terrestrial-based navigation network, or any other type of positioning technology known in the art of wireless navigation assistance.

The automotive computer 145 may be or include an electronic vehicle controller (e.g., the AV controller depicted in FIG. 8), having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (TSDN) that provides digital data services to the vehicle 105 and other vehicles (not shown in FIG. 1) that may be part of a vehicle fleet (vehicle fleet not shown in FIG. 1). A human agent 169 may also provide remote assistance to the vehicle 105 in instances where the AVC 199 does not find sufficient information in a knowledge library 173.

Although illustrated as a sport utility, the vehicle 105 may take the form of another passenger or commercial automobile such as, for example, a car, a truck, a crossover vehicle, a van, a minivan, a taxi, a bus, etc., and may be configured and/or programmed to include various types of automotive drive systems.

Example drive systems can include various internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, the situation handling system 107 may be configured and/or programmed to operate with a vehicle having a Level-4 or Level-5 autonomous vehicle controller. An example AVC 199 is described in greater detail with respect to FIG. 4.

The mobile device 120 generally includes a memory 123 for storing program instructions associated with a ridehail application 135 that, when executed by a mobile device processor 121, performs aspects of the disclosed embodiments. The application (or "app") 135 may be part of the situation handling system 107, or may provide information to the situation handling system 107 and/or receive information from the situation handling system 107. The mobile device 120 may be and/or include a ridehail application 135 configured to provide information usable in a close situation, with which the AI agent 197 identifies situations, generates a situation data set, identifies a prior situation remedy, and assigns service tasks, and ultimately, improve user experience for the users 140.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) 133 that can be direct connection(s) between the vehicle 105 and the mobile device 120. The wireless connection(s) 133 may include various low-energy protocols including, for example, Bluetooth®, BLE, LoRaWAN, or other Near Field Communication (NFC) protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the situation handling system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a situation handling program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Body and Network Communication Controller (BANCC) 187, and/or other control modules. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets received from the ridehail application 135 operating on the mobile device 120, from one or more instruction sets stored in computer memory 155 of the automotive computer 145, including instructions operational as part of the situation handling system 107.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 12 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the situation handling system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from the AVC 199 autonomous vehicle controller, the situation handling system 107, and/or via wireless signal inputs received via the wireless connection(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and user integration systems. In other aspects, the BCM 193 may control auxiliary equipment functionality, and/or be responsible for integration of such functionality.

In some aspects, the vehicle 105 may include one or more Door Access Panels (DAPs) 191 disposed on exterior door surface(s) of vehicle door(s) 198, and connected with a DAP controller (not shown in FIG. 1). In some aspects, the user 140 may have the option of entering a vehicle by typing in a personal identification number (PIN) on an exterior interface associated with a vehicle in order to, for example, unlock the door handle 196. The user interface may be included as part of a Door Access Panel (DAP) 191, a wireless keypad, included as a part of the mobile device 120, or included as part of another interface. In some embodiments, it could be a camera that a user could show a QR code from his/her mobile phone as the access authentication or use facial recognition as the authentication where such application is legal. The DAP 191, which may operate and/or communicate with the BCM 193, BANCC 187 or another of the ECUs 117, can include and/or connect with an interface with which a ridehail passenger, user, (or any other user such as the user 140) may input identification credentials and receive information from the system. In one aspect, the interface may be or include a DAP 191 disposed on a vehicle door 198, and can include an interface device from which the user can interact with the system by selecting their unique identifier from a list, and by entering personal identification numbers (PINs) and other non-personally identifying information. In some embodiments, the interface may be a mobile device, a keypad, a wireless or wired input device, a vehicle infotainment system, and/or the like. Accordingly, it should be appreciated that, although a DAP is described with respect to embodiments herein, the interface may alternatively be one or more other types of interfaces described above.

The BANCC 187, can be a separate ECU 117 or its functionality may be incorporated into the BCM 193 or one or more of the other ECUs and includes sensory and processor functionality and hardware to facilitate user and device authentication, and provide occupant customizations and support that provide customized experiences for vehicle occupants.

A Vehicle Perception System (VPS) 181 may include internal and external sensory systems (collectively referred to as sensory system 182). The sensory system 182 may be configured and/or programmed to obtain sensor data usable for biometric authentication, and for performing driver assistance operations such as, for example, active parking, trailer backup assistance, adaptive cruise control and lane keeping, driver status monitoring, and/or other features.

The computing system architecture of the automotive computer 145, VCU 165, and/or the situation handling system 107 may omit certain computing modules. It should be readily understood that the computing environment depicted in FIG. 1 is an example of a possible implementation according to the present disclosure, and thus, it should not be considered limiting or exclusive.

Embodiments of the present disclosure may provide a comprehensive solution that solves the problem of scalability and learning in an autonomous vehicle system. The situation handling system 107 may be configured and/or programmed with any vehicle (e.g., the vehicle 105) serving public riders (referred to herein as ride hailing). In the ride hailing business, riders' needs may be, at times, unpredictable, and solutions are highly context-dependent, where the conventional approach will easily fail within real-world applications, as explained in previous sections.

Situations that may arise in ride hailing can include an endless array of scenarios that range from management of environmental controls in the cabin to handling unforeseen vehicle damage events. For example, as the vehicle 105 operates in the city, a situation may arise where a stray rock flies up from the road surface and smashes a side window of the vehicle 105. The vehicle may discover a severe crack in the side window via the VPS 181. In one case, the crack may be minor, where the situation goal is to arrive at the trip destination without providing any window controls to the user 140 that allow the user to roll down the window, which may shatter the cracked glass. In another use case, the window may be severely damaged, where loose glass has fallen into the vehicle interior. The situation goal may now be to provide a safe location for the passenger to exit the vehicle, switch seats, wait for another ridehail vehicle to pick them up and continue their journey, or some other action. Using conventional AV infrastructure, individual cases would have to be programmed in advance, resulting in a never-ending march to a bloated computer operating environment. Vehicle control according to embodiments of the present disclosure may provide situation handling that does not rely exclusively on pre-programming.

Figure 2:
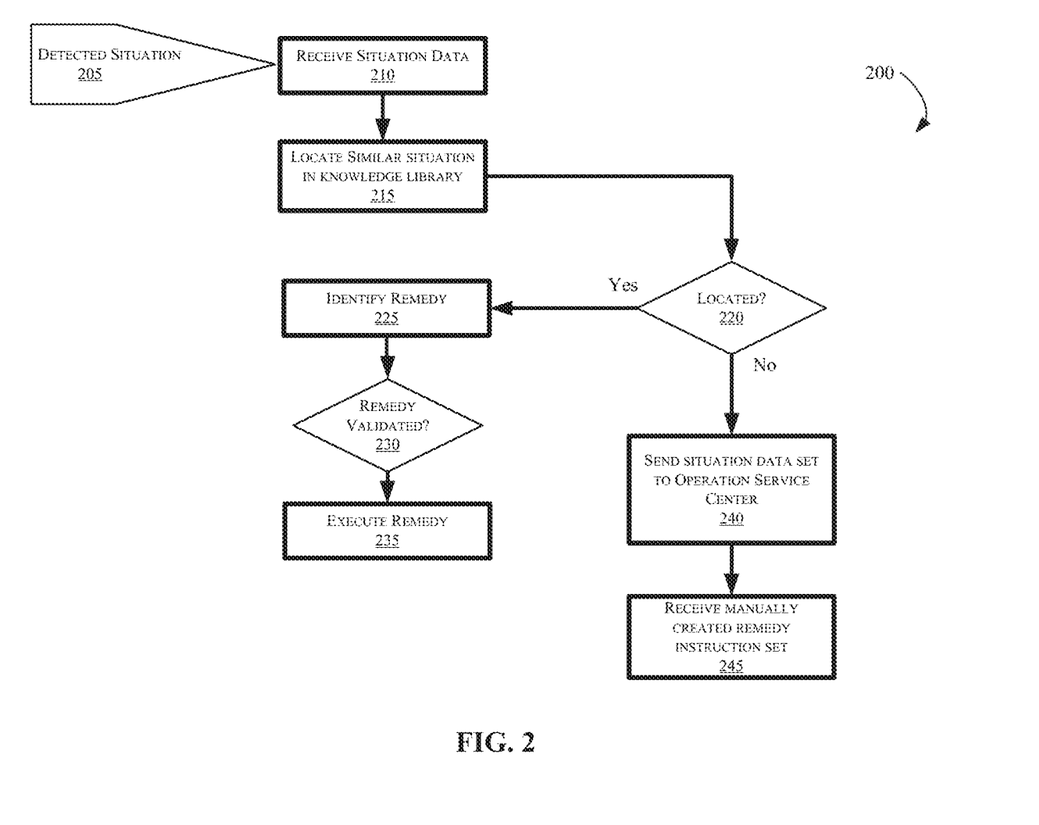
FIG. 2 illustrates a flow diagram of a method for controlling an autonomous vehicle in accordance with the present disclosure.

FIG. 2 illustrates a flow diagram of a method 200 for controlling the vehicle 105 in accordance with the present disclosure. The method 200 describes one example embodiment of situation handling performed by the AVC 199. It should be appreciated that the nature of a situation, as used herein, implies that the situation may be any conceivable scenario that may be encountered by an AV as it provides ridehail services. For example, the vehicle 105 may arrive at a destination selected by the user(s) 140 participating in a trip. Heavy rain at the time of arrival may have created puddles at the selected point of vehicle departure that would be avoided normally if the vehicle 105 were manually operated by a human driver. However, the vehicle 105 may determine that the destination for the drop off and offboarding procedure is a safe location such that no personal or vehicle harm would result in dropping off the passengers. However, the user experience may be significantly improved if they do not have to disembark from the vehicle by stepping into deep puddles of water.

With this scenario, at step 205, the situation handling system 107 may detect a situation (e.g. standing water in a drop-off location) in one or more ways, that can include detecting the presence of standing water at the destination point via the sensory system 182, and/or via receiving an indication of the presence of a situation from one or more other AI agents, including a dialogue agent (not shown in FIG. 2). Other AI agents may include agents operating in one or more other AVs functional as part of a vehicle fleet. In another aspect, the AI agent may be a remote agent operative on the server(s) 170 (depicted in FIG. 1). Other scenarios where AI agents may operate are possible.

The situation handling system 107 may receive the situation data set at step 210, which in the present example scenario, may include receiving sensor data indicative of standing water localized at the drop-off point.

At step 215, responsive to receiving the situation data set, the situation handling system 107 may access the knowledge library 173 via the network(s) 125 (knowledge library and network(s) depicted in FIG. 1), and attempt to locate a situation data set in the knowledge library having a sufficient number of parallel or identical characteristics in common with the data set received at step 210 to consider the prior situation similar to the current situation to be useful in satisfying the current situation goal. An expanded description of the substeps associated with the process of Step 215 is discussed with reference to FIG. 5B. For example, a prior situation may have been remedied by performing the drop off at a point that is a full vehicle width from the curb, instead of parking right at the curb as in a typical drop-off. The prior situation may have been different but similar to the present situation in various ways. For example, the prior situation may have included four vehicle passengers instead of 1, and may have had to avoid a much larger puddle than the standing water at issue in the present situation. Nevertheless, it may be advantageous for the situation handling system 107 to search for prior situations handled by the vehicle 105, or another similar vehicle, that were similar to the circumstances of the present situation. The situation handling system 107 may evaluate whether the differences between the situations are negligible such that the remedy executed in the prior situation could also apply here as a solution to the present situation, or whether the prior situations are too different from the present case to be useful in satisfying the current situation goal.

Figure 3:
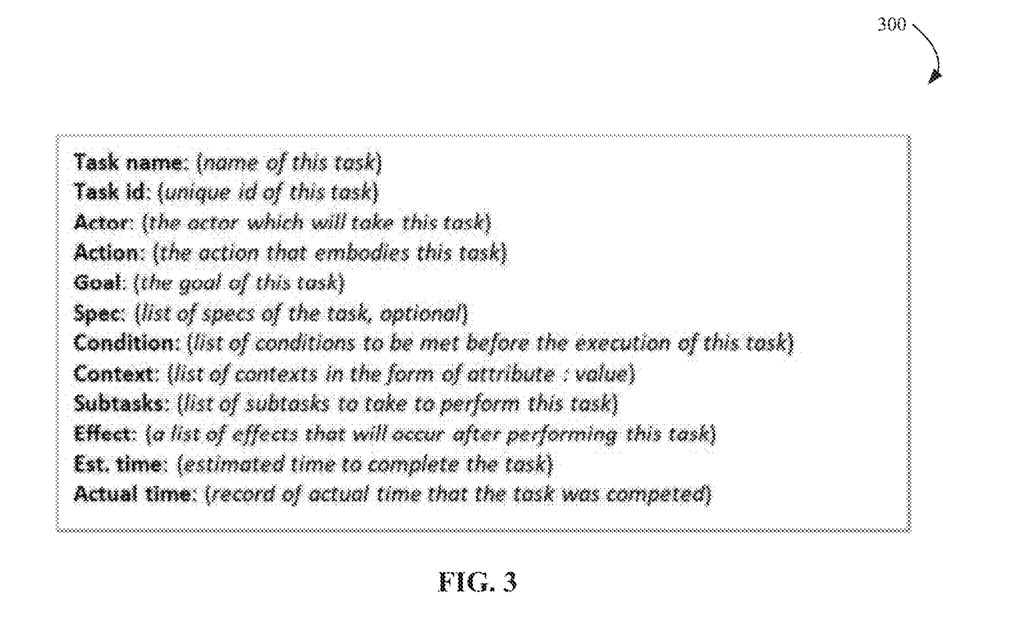
FIG. 3 depicts an example generic data structure for a task record, in accordance with the present disclosure.

To perform this step, the AI agent 197 may determine that one or more data sets stored in the knowledge library 173 is a probable match using various information retrieval techniques that are familiar to the experts in this field between characteristics associated with the present situation data (received at step 210), and the characteristics associated with respective data sets in the knowledge library 173. FIG. 3, discussed in greater detail hereafter, depicts a task record 300 that includes situation details or characteristics that may be indexed in the knowledge library 173 and used for points of comparison. The AI agent 197 may first compare a situation name and context information from situation data sets in the knowledge library 173 at step 220, and compare those elements to contextualized aspects of the current situation (context is described in greater detail with respect to FIG. 3 and FIG. 5B). The AI agent 197 may then retrieve any situation in the knowledge library 173 that best matches (e.g., shares characteristics such that a similarity metric indicative of similar matches meets or exceeds a predetermined threshold for similarity) with the current situation and context information.

At step 225 the situation handling system 107 may identify one or more possible remedies associated with the similar situation data set encountered in the past during other ridehail trips. The remedy is executed with respect to the current trip plan by modifying the trip plan to specifically add tasks, delete tasks or modify existing tasks.

Figure 6:
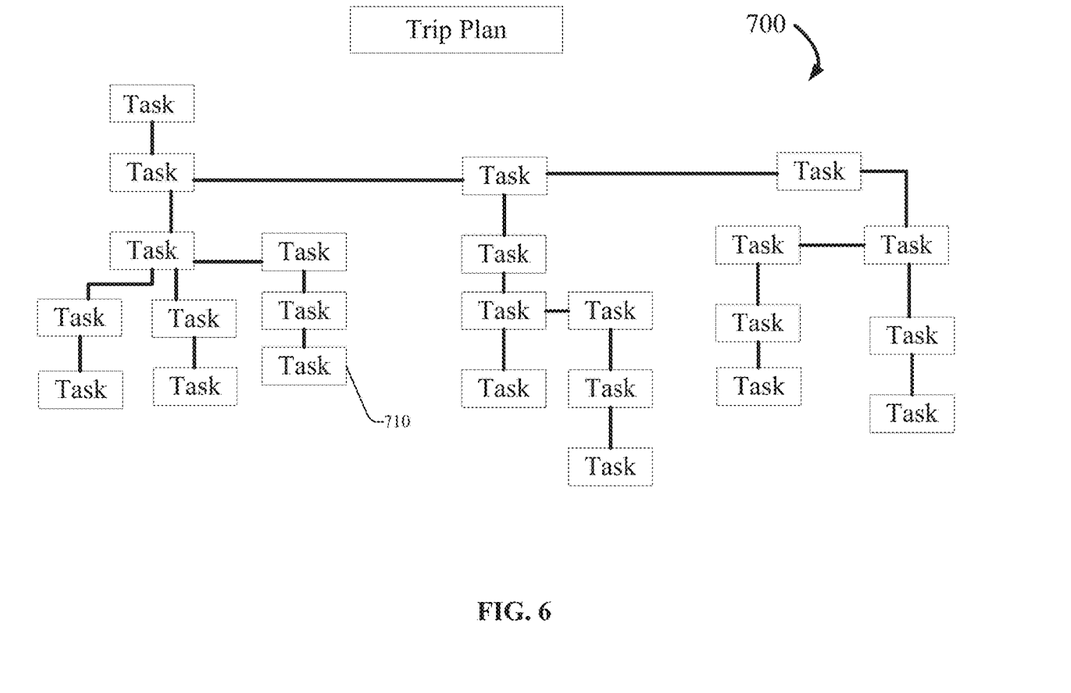
FIG. 6 depicts a trip plan including a task tree.

Trip tasks may be organized as ordered tasks in a task tree structure (an example of which can be seen in FIG. 6). As explained in the following paragraphs, the AVC 199 includes a trip plan defining the current ridehail trip. The trip plan may include parent tasks that may be divided into one or more subtasks, referred to throughout the present disclosure as child tasks. Completion of a parent task may be dependent on successful completion or resolution of an associated child task, or in a case where the parent task does not have any dependencies or lower order tasks, the parent task may be complete when the task itself is executed successfully, and the world state is updated to reflect a complete state.

For example, a parent task could be performing a ridehail trip task for a user. Because a ridehail trip task may include many sub-tasks that must all be completed before the trip is considered complete, the parent task may include subsequent Nth order tasks from which the completion of the highest order depends. This information may be stored as subtasks, where condition information is also indexed in the condition portion of the task record 300. An Nth order task can include child tasks that are associated with the parent task, where the parent task depends on successful completion of the child task. For example, a parent task may be the task earlier described as a "ridehail trip." The trip task could include a plurality of child tasks including, for example, a Pick-up Drive task, an Onboarding Passenger task, a Trip Driving task, and finally the Offboarding task. Responsive to determining that individual lower-order tasks are complete, the AVC 199 may update the memory state location (not shown in FIG. 3) associated with the ridehail trip task with an indication for each respective task and sub task, and sub task of the sub task, etc., that the ridehail trip task is complete.

The AVC 199 may further expand one or more of the child tasks to include additional sub-tasks (third order tasks), and so forth, which operate in the same fashion with respect to relative dependencies and task state updating. As in the above mentioned example, the Onboarding task can further be decomposed into third order tasks: Connect-the-rider task, Authenticate the Rider task, (Load Luggage task, if appropriate), Embark-the-rider task, and Get-ready-to-go task. It should be appreciated that one benefit of the disclosed embodiments is the use of a generic format as shown with respect to the task record 300, where the same data structure shown in FIG. 3 may apply to a parent task, and equally to any other Nth order tasks that may be related to the parent task.

For example, when the AI agent 197 determines a parent task and selects and/or generates any subsequent dependent tasks (second-Nth order tasks), the AVC 199 may organize the task tree (shown in FIG. 6) that includes higher order tasks with dependencies associated with respective lower-order tasks. The task record 300 may include all dependency and conditional information, as well as specific characteristics that index and define a task.

All tasks may include a memory location association in the data structure of the task record 300 that indicates a state of the respective task. In one embodiment, the task state may be satisfied "e.g., 0", or unsatisfied "e.g., 1". The unsatisfied state indicates that the task or sub task has yet to be completed. In other aspects, the completed task state may indicate that the task and all lower order sub tasks from which the respective task depends have been completed and satisfied. Stated in another way, a higher order task may not be satisfied or marked as a "complete" state until all subsequent lower-level tasks (if any) are marked as complete, and the state associated with the higher order task is also marked as complete. A task list may be and/or include a data structure having all dependent and/or independent links associating parent tasks with their respective Nth order tasks (if any).

For example, the parent task of onboarding task, described above, may include a series of discrete sub-steps for bringing a ridehail passenger (e.g., the user(s) 140) into the vehicle 105, ensuring that the user 140 is correctly associated with the vehicle 105 and has sufficiently completed prerequisite steps for engaging the vehicle 105 as a ridehail provider, driving the user 140, and performing any subsequent steps such as profile updating, cleanup, transmission of trip-related information, etc. to the OSC. The onboarding task may include a set of sub-tasks, such as, connecting to a central computer such as a OSC, authenticating the ridehail passenger with the server(s) 171, and opening the door vehicle door 198 after the user has been authenticated.

The remedy is generally applied to the current ridehail trip plan as a list of actions one by one. For example, the trip plan 700 of FIG. 6 includes multiple sub-task items 710 and the remedy would be applied to the trip plan by maintaining, deleting or modifying each of the existing sub-tasks 710 in the trip plan or adding additional tasks to the task tree. In some embodiments, the remedy information associated with the prior situation data set may itself include a list of sub-tasks (used for executing the remedy).

The situation handling system 107 may include a validator module (not shown in FIG. 2) configured and/or programmed to validate any unexecuted tasks that are associated with the identified current situation. When the AI agent 197 identifies a similar prior situation from the knowledge library 173, the situation handling system 107 may validate the remedy identified at step 230 using the validator module. To validate the unexecuted tasks, the AI agent 197 may perform one or more computer-based simulations using the states associated with tasks in the identified remedy.

As explained in greater detail with respect to FIG. 3, the states associated with respective tasks may indicate whether a particular condition for that task has been met (e.g., whether the task identified in the remedy has already been successfully executed according to the current situation data set, and whether tasks from which that state depends have been satisfied). During validation, the AI agent 197 ascertains the state of the world associated with the situation and generates simulated world states that are applied against the new trip tasks to determine whether the new trip tasks can achieve the desired goals. More specifically, the situation handling system 107 identifies the simulated world state, checks the conditions of the trip task against the simulated world state; simulates the execution of the trip task, determines the changes to the simulated world state that occur during simulation of the trip task, compares the goals of the trip task to the changed simulated world state, and if the goals are achieved, the validation is considered passed and the revised task plan is ready for execution.

Responsive to determining that all requisites are met, and tasks are complete via the simulation, at step 235, the AI agent 197 may execute the remedy by executing changes to the current ridehail trip plan to generate a new trip plan and then implementing the new trip plan by executing instructions associated with the new tasks using vehicle system.

If, at step 220, the AI agent 197 determines that no suitable match is found in the knowledge library 172, the AI agent 197 may send the current situation data set to the Operation Service Center (OSC) 171 at step 240. The human agent 169 (depicted in FIG. 1 as operating a computer station at the OSC 171) may receive the current situation data set, and manually craft a new remedy instruction set at step 245 for the current situation using a Knowledge Expert Editor (KEE) user interface. The KEE user interface is a comprehensive interface that allows trained customer support Knowledge Experts (e.g., the human agent 169) to craft new remedies in real time while the vehicle 105 is in the field experiencing the situation. The KEE may abstract specific complexities of the underlying codebase, such that the a human agent 169 can focus on problem solving.

Figure 4:
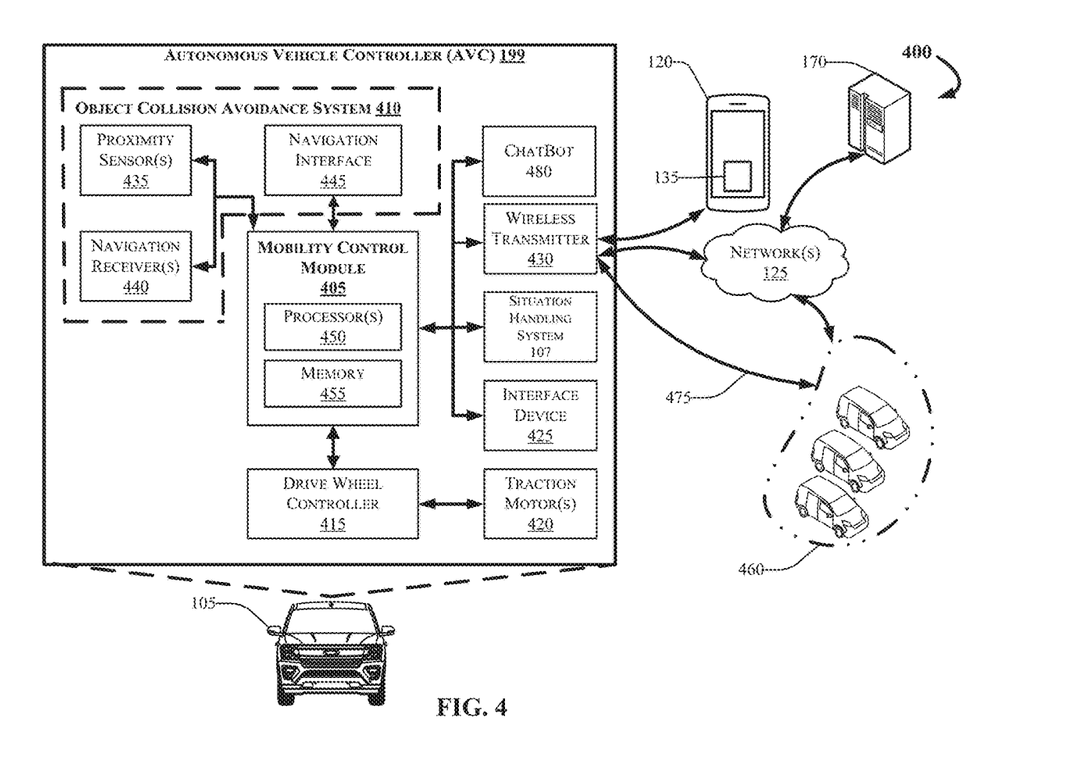
FIG. 4 depicts a block diagram of an example Autonomous Vehicle Controller (AVC), in accordance with the present disclosure.

FIG. 3 depicts an example generic data structure for a task record 300, in accordance with the present disclosure. The task data set may include information indicative of, for example, a task name, a task identification (ID), an actor, an action, a goal, specifics associated with a particular task, conditions that must be met before execution of the task, context information in the form of attribute values, subtasks associated with a given task, a list of effects that will occur after performing the task, estimated time information associated completion of the task, and a record of actual time that the task is completed, FIG. 4 depicts a block diagram of an example AVC 199, in accordance with embodiments. The AVC 199 may include an object collision avoidance system 410 disposed in communication with a mobility control module 405. The object collision avoidance system 410 may perform object detection, navigation, and provide navigational interactive control features. The mobility control module 405 may be configured and/or programmed to receive data from the object collision avoidance system 410 to provide vehicle control.

The AVC 199 may be disposed in communication with and/or include the situation handling system 107, in accordance with embodiments described herein. For example, the situation handling system 107 may generate one or more tasks associated with a remedy generated by the system. The tasks may include encoded instructions for executing the task. Accordingly, the AVC 199 may receive the task, and execute the portions of the task instructions associated with autonomous vehicle operation.

The AVC 199 may be disposed in communication with and/or include a natural language dialogue system or Chat-Bot 480. The ChatBot 480 may communicate with one or more other vehicles in the fleet 460, and/or the Operation Service Center, and/or a central routing computer (e.g., the server(s) 170 as described with respect to FIG. 1) using a wireless communication network such as, for example, the network(s) 125.

The mobility control module 405 may include one or more processor(s) 450, and a memory 455. The processor(s) 450 may be one or more commercially available general-purpose processor(s), such as a processor from the Intel® or ARM® architecture families. In some aspects, the mobility control module 405 may be implemented in a system on a chip (SoC) configuration, to include other system components such as RAM, flash storage and I/O buses. Alternatively, the mobility control module 405 can be implemented using purpose-built integrated circuits, or any other suitable technology now known or later developed.

The memory 455 may include executable instructions implementing the basic functionality of the AVC 199 and a database of locations in a geographic area. For example, the mobility control module 405 may connect with a drive wheel controller 415. The drive wheel controller 415 may communicate signals to one or more traction motor(s) 420, which may embody drive mechanisms such as a brushless direct current (DC) motor, or another traction motor technology. The mobility control module 405 may cause the drive wheel controller 415 to transmit motive signals to the traction motor(s) 420 to the vehicle 105.

The AVC 199 may further include an interface device 425 having input and output surfaces (not shown in FIG. 4) for providing interactive access to users onboard the AV (e.g., the vehicle 105). For example, the interface device 425 may include a touch screen interface surface configured and/or programmed to provide operational information such as power consumption information, battery health, battery level, etc. In some embodiments, the interface device 425 may further provide control features for controlling other motive aspects of the vehicle 105, such as breaking, acceleration, etc.

The interface device 425 may also communicate information to and from the navigation interface 445, and/or be integral with the navigation interface 445 such that they share a common touch screen interface. The interface device 425, either alone or in conjunction with the navigation interface 445, may provide control prompts and receive operator inputs. In one embodiment, a detailed 3D map that is used for AV navigation will be projected on the screen. A phantom shape of the vehicle is placed on this 3D map. This is called augmented reality (AR). The rider could use his/her finger to move this phantom vehicle on the touchscreen to indicated where he/she wants the vehicle to stop so that he/she can disembark from that location.

The vehicle 105 may be further configured and/or programmed to communicate information with other devices and vehicles using a wireless transmitter 430. The wireless transmitter 430 may communicate with one or more other vehicles in the fleet 460, and/or a central routing computer (e.g., the server(s) 170 as described with respect to FIG. 1) using a wireless communication network such as, for example, the network(s) 125. The network(s) 125 may be the Internet, a private network, a cellular telephone provider's data network, or other network infrastructure such as, for example, a vehicle-to-vehicle communication network. An example of a vehicle-to-vehicle communication protocol may be, for example, a dedicated short-range communication (DSRC) protocol.

The AVC 199 may be disposed in communication with the network 125. The vehicle 105 may communicate with one or more other vehicles in a fleet of vehicles 465 in various ways, including via an indirect communication channel 470 using the network(s) 125, and/or via any number of direct communication channels 475.

The object collision avoidance system 410 may include one or more proximity sensor(s) 435, one or more navigation receiver(s) 440, and a navigation interface 445 through which users of the AVC 199 may enter a destination, waypoint stop, or other location-based information. The object collision avoidance system 410 may communicate control signals to a mobile device application (e.g., the ridehail application(s) 135 described with respect to FIG. 1).

The object collision avoidance system 410 may provide route management and communication between one or more other vehicles in the fleet, and to the operator of the vehicle. The object collision avoidance system 410 may receive operator input via the navigation interface 425 to receive user selections indicative of particular user needs that could indicate the presence of a situation to the situation handling system 107. The mobility control module 405 may receive navigational data from the navigation receiver(s) 488 and the proximity sensor(s) 488, determine a navigational path from a first location to a second location, and provide instructions to the drive wheel controller 415 for autonomous, semi-autonomous, and/or manual operation.

The navigation receiver(s) 488 can include one or more of a global positioning system (GPS) receiver, and/or other related satellite navigation systems such as the global navigation satellite system (GLNSS), Galileo, or other similar systems known in the art of autonomous vehicle operation. Additionally, the navigation receiver(s) 488 can be configured and/or programmed to receive locally based navigation cues to aid in precise navigation through space-restricted areas, such as, for example, in a crowded street, and/or in a distributed beacon environment. When deployed in conjunction with a distributed beacon network (not shown in FIG. 4), locally based navigation cues can include communication with one or more purpose-built location beacons (not shown in FIG. 4) placed throughout a geographic area. The navigation cues may enable an increased level of navigation precision and provide specific indicators for locations of various points of interest. In other aspects, the navigation receiver(s) 488 may include one or more navigation transceivers (not shown in FIG. 4) for communication with mobile network infrastructure for cell tower triangulation and use of known-location Wi-Fi hotspots. Any location technology now known or later developed that can provide a high precision location (e.g. preferably within a linear foot) can be useful as part of the navigation receiver(s) 440.

The proximity sensor(s) 435 may work in connection with the navigation receiver(s) 440 to provide situational awareness to the mobility control module 405 for autonomous navigation. For example, the proximity sensors may include one or more Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The proximity sensor(s) 435 may alert the mobility control module 405 to the presence of sensed obstacles, and provide trajectory information to the mobility control module 405, where the trajectory information is indicative of moving objects or people that may interact with the vehicle 105. The trajectory information may include one or more of a relative distance, a trajectory, a speed, a size approximation, a weight approximation, and/or other information that may indicate physical characteristics of a physical object or person.

The mobility control module 405 may be configured and/or programmed to aggregate information from the navigation receiver(s) 440, such as current position and speed, along with sensed obstacles from the proximity sensor(s) 435, and interpret the aggregated information to compute a safe path towards a destination such that the vehicle 105 avoids collisions. Sensed obstacles can include other vehicles, pedestrians, animals, structures, curbs, and other random objects. In some implementations the proximity sensor(s) 435 may be configured and/or programmed to determine the lateral dimensions of the path upon which the vehicle 105 is traveling, e.g. determining relative distance from the side of a sidewalk or curb, to help aid mobility control module 405 in maintaining precise navigation on a particular path.

The navigation interface 445 may allow a rider to enter identity information, logon credentials, a target destination, and other information such as, a change in rideshare destination, a special request such as seating arrangements within the vehicle, a stop at a waypoint en route to the destination, or other inputs. In one embodiment, the user input using the navigation interface 445 may provide the situation data (e.g., step 210 as discussed with respect to FIG. 2). The input may also be indicative of the situation goal (e.g., add a waypoint or other unexpected stop, provide a drop-off that accommodates a physical limitation of the user 140, etc.). In addition, the navigation interface 445 can provide information associated with various points of interest, such as historical or reference facts. For example, where point of interest is a shopping center, the navigation interface 445 can present information such as various stores and attractions that are located in the shopping center, hours of operation, etc. Similarly, where point of interest is a recreation center or sports center, navigation interface 445 can present information on upcoming events, ticket availability and prices, and similar such data. Such data is typically stored in a database file either located as part of memory in mobility control module 405, or possibly in navigation interface 445, if configured with a separate chatbot 480.

Figure 5A:
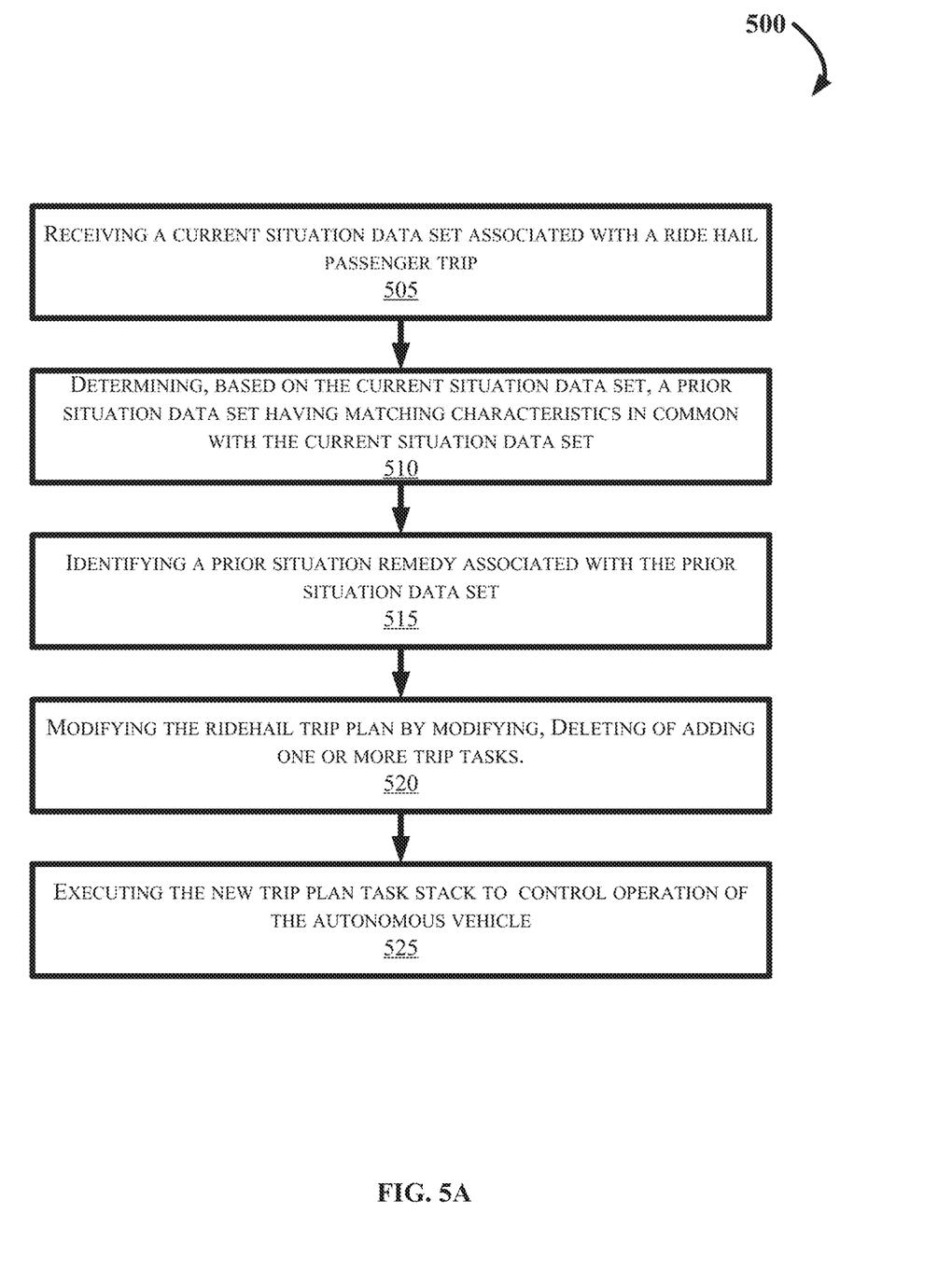
FIGS. 5A-5B depicts a flow diagram of an example method in accordance with the present disclosure.

FIG. 5A is a flow diagram of an example method 500 for controlling an AV, according to the present disclosure. FIG. 5A may be described with continued reference to prior figures, including FIGS. 1-4. The following process is exemplary and not confined to the steps described hereafter. Moreover, alternative embodiments may include more or less steps that are shown or described herein, and may include these steps in a different order than the order described in the following example embodiments.

With reference to FIG. 5A, at step 505, the method 500 may commence with receiving a current situation data set associated with a ridehail passenger trip.

At step 510, the method 500 may further include determining, based on the current situation data set, a prior situation data set having matching characteristics in common with the current situation data set. This step may include identifying a situation goal based on the current situation data. Step 510 is further expanded in the flow diagram 600 of FIG. 5B.

At step 515, the method 500 may further include identifying a prior situation remedy associated with the prior situation data set. After identifying the prior situation remedy in the prior situation data set, the method can include validation of the prior situation remedy. Accordingly, the system may validate, using a validator system, that the new trip tasks are likely to satisfy the situation goal in the manner described above. The validation step may result in an affirmative result, indicative that the task plan is likely to satisfy the situation goal. Responsive to determining that the goal would be satisfied if the system assigns the proposed prior situation remedy to the task and executes the task plan, the method includes proceeding to the next step (step 520).

At step 520, the method 500 may further include modifying the ridehail trip plan by deleting, adding or modifying sub-tasks in the trip taskplan to execute the desired remedy. This step may include assigning to the task, based on the parent service task, a set of children service tasks, and executing the task plan by performing the children service tasks subsequent to performing the parent service task.

At step 525, the method 500 may further include executing the task plan associated with the new trip plan, wherein the executing modifies a control operation of the autonomous vehicle.

With reference again to step 515, according to one embodiment, the vehicle may determine that the task plan is not suitable to remedy the current situation. Responsive to determining that the task plan is not likely to satisfy the situation goal, the method may include generating a situation support request message and transmitting the situation support request message to an Operations Service Center (OSC). The OSC may receive the situation support request message, where a human operator may craft a new remedy using an integrated Knowledge Expert Editor interface. The KEE interface may include a platform that searches a database of prior situations and their associated remedies, and references past solutions that were and were not effective in addressing edge cases. The KEE interface may apply predetermined and/or other task from a task database. In one example embodiment, the human operator may sequence one or more remedy actions that address the situation goal. The KEE interface may validate the proposed remedy using a simulation validator, and responsive to determining that the situation goal is met using the proposed task plan, forward the proposed task plan to the vehicle.

The vehicle may receive, from the OSC, the second task plan responsive to transmitting the situation support message, and execute the second task plan. The executing modifies a control operation of the autonomous vehicle.

Figure 5B:
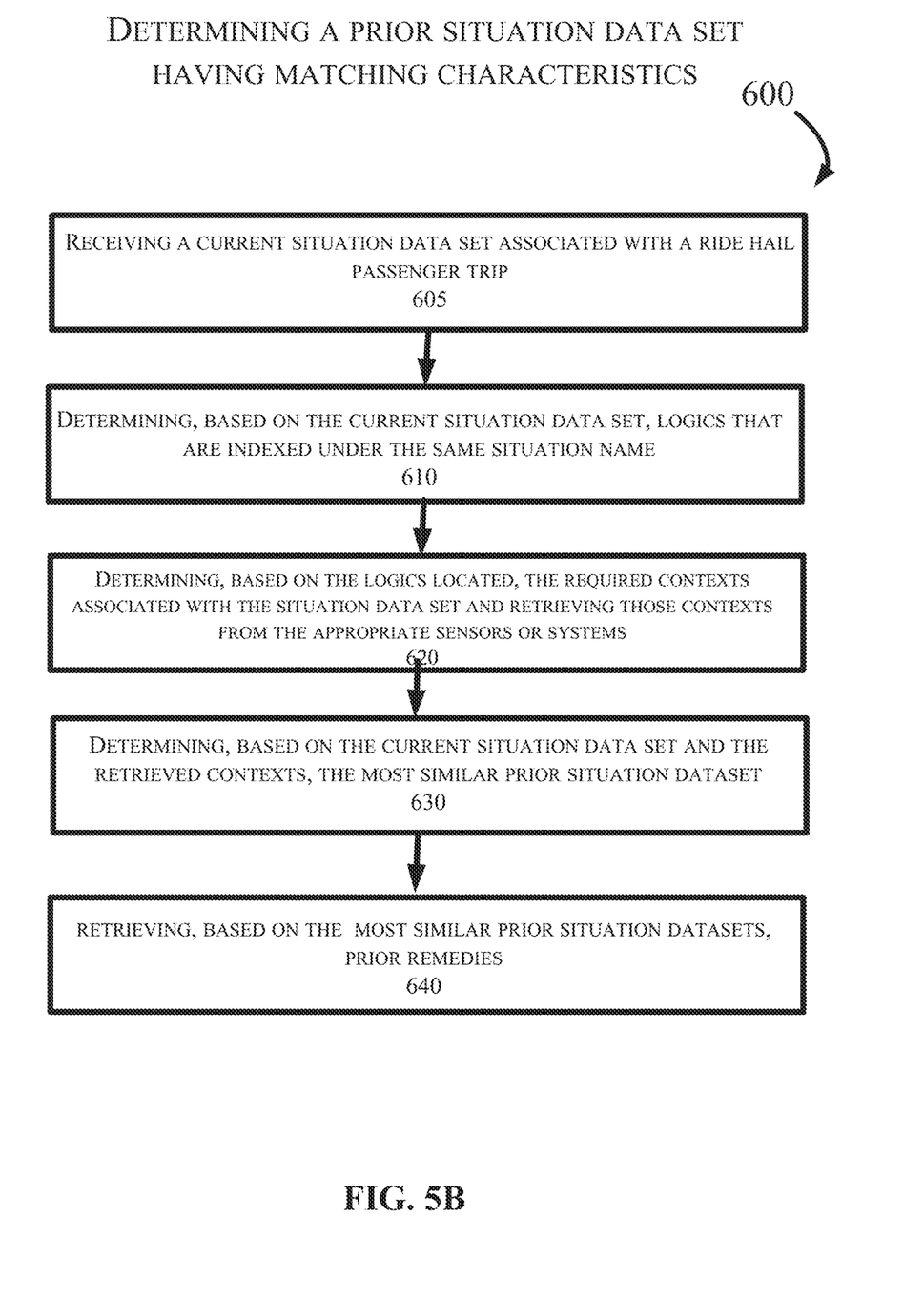

At step 605, the method 600 includes receiving the current situation data set as in Step 505 of FIG. 5A. After receiving the current situation data set in step 605, the system determines what logics are indexed under the same situation name in step 610. The logics determined in step 610 allow the system to locate and compile the contexts (also described in FIG. 3) to be retrieved for the current situation, from the various sensors and systems including the ACU, 199, VCU 165, the network 125, the fleet 460 or any other appropriate source. Step 630 then determines, based upon the contexts and the other available current situation data, the most similar prior situation data set and retrieves the prior remedies used for the prior situation in step 640. These remedies can then be used to modify the current ride hail trip plan and be verified prior to being executed as in step 525 of FIG. 5A.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling an autonomous vehicle, comprising:
    receiving a current situation data set associated with a ridehail passenger trip;
    generating, by the autonomous vehicle and based on the current situation data set, a trip plan comprising a set of tasks to be executed in order to complete the ridehail passenger trip;
    determining the presence of a situational issue that cannot be resolved by executing the trip plan, wherein the situational issue comprises at least one of a weather issue, a transient environmental obstruction located at a pick-up location or a drop-off location of the ridehail passenger trip, a vehicle damage event, and a traffic incident, and wherein the traffic incident comprises at least one of a pedestrian traffic incident and a vehicular traffic incident;
    determining, based on the current situation data set, a prior situation data set having matching characteristics in common with the current situation data set and the situational issue, the prior situation data set comprising a prior set of tasks;
    identifying a prior situation remedy associated with the prior situation data set, the prior situation remedy solving the situational issue;

assigning, to the trip plan, a parent task associated with the prior situation remedy to create a modified trip plan; and executing the modified trip plan, wherein the executing modifies a control operation of the autonomous vehicle.

2. The method according to claim 1, further comprising:
creating the modified trip plan by assigning to the trip plan, based on the parent task, a subtask, wherein the subtask is based on the prior situation remedy; and
executing the modified trip plan by performing the subtask in order to complete the parent task.

3. The method according to claim 1, further comprising:
identifying a situation goal based on the current situation data set;
validating, via a validator system, that the modified trip plan is likely to satisfy the situation goal; and
executing the modified trip plan responsive to determining that the modified trip plan is likely to satisfy the situation goal.

4. The method according to claim 1, further comprising:
identifying a situation goal based on the current situation data set;
validating, via a validator system, that the modified trip plan is not likely to satisfy the situation goal; and
generating a situation support request message.

5. The method according to claim 4, further comprising:
transmitting the situation support request message to an Operation Service Center (OSC);
receiving, from the OSC, a second modified trip plan responsive to transmitting the situation support request message; and
executing the second modified trip plan, wherein the executing modifies the control operation of the autonomous vehicle.

6. The method according to claim 1, further comprising:
prior to determining the prior situation data set with matching characteristics, searching the prior situation data to find prior situations data sets identified as logics that are indexed under a same situation name;
determining, from the logics, information generally stored in relation to the same situation name, the information identified as contexts; and
retrieving from any associated system, appropriate context information related to the current situation data set;
wherein the current situation data set comprises one or more of:
  a situation name indicative of a situation class;
  time information indicative of a time associated with a current situation of the current situation data set;
  task information indicative of a task associated with the situation name;
  context information indicative of a detail associated with the current situation;
  remedy information indicative of an instruction set for executing an action; and
  logistics information configured to cause a processor to acquire context information associated with a situation.

7. The method according to claim 1, further comprising: updating a knowledge library with the current situation data set.

8. A system for control of an autonomous vehicle, comprising:
a processor; and
a memory for storing executable instructions, the processor programmed to execute the instructions to:

receive a current situation data set associated with a ridehail passenger trip;
generate, based on the current situation data set, a trip plan comprising a set of tasks to be executed in order to complete the ridehail passenger trip;
determine the presence of a situational issue that cannot be resolved by executing the trip plan, wherein the situational issue comprises at least one of a weather issue, a transient environmental obstruction located at a pick-up location or a drop-off location of the ridehail passenger trip, a vehicle damage event, and a traffic incident, and wherein the traffic incident comprises at least one of a pedestrian traffic incident and a vehicular traffic incident;
determine, based on the current situation data set, a prior situation data set having matching characteristics in common with the current situation data set and the situational issue, the prior situation data set comprising a prior set of tasks;
identify a prior situation remedy associated with the prior situation data set, the prior situation remedy solving the situational issue;
assign, to the trip plan, a parent task associated with the prior situation remedy to create a modified trip plan; and
execute the modified trip plan, wherein the executing modifies a control operation of the autonomous vehicle.

9. The system according to claim 8, wherein the processor is further programmed to:
assign to the trip plan, based on the parent task, a subtask, wherein the subtask is based on the prior situation remedy in order to create the modified trip plan; and
execute the modified trip plan by performing the subtask in order to complete the parent task.

10. The system according to claim 8, wherein the processor is further programmed to:
identify a situation goal based on the current situation data set;
validate, via a validator system, that the modified trip plan is likely to satisfy the situation goal; and
execute the modified trip plan responsive to determining that the modified trip plan is likely to satisfy the situation goal.

11. The system according to claim 8, wherein the processor is further programmed to:
identify a situation goal based on the current situation data set;
validate, via a validator system, that the modified trip plan is not likely to satisfy the situation goal; and
generate a situation support request message.

12. The system according to claim 11, wherein the processor is further programmed to:
transmit the situation support request message to an Operation Service Center (OSC);
receive, from the OSC, a second modified trip plan responsive to transmitting the situation support request message; and
execute the second modified trip plan, wherein the executing modifies the control operation of the autonomous vehicle.

13. The system according to claim 8, wherein the current situation data set comprises:
a situation name indicative of a situation class;
time information indicative of a time associated with a current situation of the current situation data set;

task information indicative of a task associated with the situation name;
context information indicative of a detail associated with the current situation;
remedy information indicative of an instruction set for executing an action; and
logistics information configured to cause the processor to acquire context information associated with a situation.

14. The system according to claim 8, wherein the processor is further programmed to execute the instruction to:
update a knowledge library with the current situation data set.

15. A non-transitory computer-readable storage medium in an autonomous vehicle controller, the computer-readable storage medium having instructions stored thereupon which, when executed by a processor, cause the processor to:
receive a current situation data set associated with a ridehail passenger trip;
generate, based on the current situation data set, a trip plan comprising a set of tasks to be executed in order to complete the ridehail passenger trip;
determine the presence of a situational issue that cannot be resolved by executing the trip plan, wherein the situational issue comprises at least one of a weather issue, a transient environmental obstruction located at a pick-up location or a drop-off location of the ridehail passenger trip, a vehicle damage event, and a traffic incident, and wherein the traffic incident comprises at least one of a pedestrian traffic incident and a vehicular traffic incident;
determine, based on the current situation data set, a prior situation data set having matching characteristics in common with the current situation data set and the situational issue, the prior situation data set comprising a prior set of tasks;
identify a prior situation remedy associated with the prior situation data set, the prior situation remedy solving the situational issue;
assign, to the trip plan, a parent task associated with the prior situation remedy to create a modified trip plan; and
execute the modified trip plan, wherein the executing modifies a control operation of the autonomous vehicle.

16. The non-transitory computer-readable storage medium according to claim 15, having further instructions stored thereupon to:
assign to the trip plan, based on the parent task, a subtask, wherein the subtask is based on the prior situation remedy in order to create the modified trip plan; and
execute the modified trip plan by performing the subtask in order to complete the parent task.

17. The non-transitory computer-readable storage medium according to claim 15, having further instructions stored thereupon to:
identify a situation goal based on the current situation data set;
validate, via a validator system, that a modified task plan is likely to satisfy the situation goal; and
execute the modified trip plan responsive to determining that the modified task plan is likely to satisfy the situation goal.

18. The non-transitory computer-readable storage medium according to claim 15, having further instructions stored thereupon to:
identify a situation goal based on the current situation data set;
validate, via a validator system, that the task plan is not likely to satisfy the situation goal; and
generate a situation support request message.

19. The non-transitory computer-readable storage medium according to claim 18, having further instructions stored thereupon to:
transmit the situation support request message to an Operation Service Center (OSC);
receive, from the OSC, a second modified trip plan responsive to transmitting the situation support request message; and
execute the second modified trip plan, wherein the executing modifies the control operation of the autonomous vehicle.

20. The non-transitory computer-readable storage medium according to claim 15, having further instructions stored thereupon to generate the trip plan comprising:
a situation name indicative of a situation class;
time information indicative of a time associated with a current situation of the current situation data set;
task information indicative of a task associated with the situation name;
context information indicative of a detail associated with the current situation information indicative of an instruction set for executing an action; and
logistics information configured to cause the processor to acquire context information associated with a situation.

* * * * *